United States Patent [19]

Kollers et al.

[11] Patent Number: 5,131,730
[45] Date of Patent: Jul. 21, 1992

[54] HYDRAULIC BRAKE SYSTEM WITH ANTI-SKID SYSTEM AND TRACTION CONTROL FOR A VEHICLE

[75] Inventors: Michael Kollers, Remseck; Guenter Wolff, Schwieberdingen; Guenter Kaes, Stuttgart, all of Fed. Rep. of Germany

[73] Assignee: Robert Bosch GmbH, Stuttgart, Fed. Rep. of Germany

[21] Appl. No.: 698,039

[22] Filed: May 10, 1991

[30] Foreign Application Priority Data

Jun. 2, 1990 [DE] Fed. Rep. of Germany ....... 4017872

[51] Int. Cl.$^5$ ............................ B60T 8/32; B60K 28/16
[52] U.S. Cl. ........................ 303/113 TR; 303/116 SP
[58] Field of Search ........ 303/113 R, 113 TR, 116 R, 303/116 SP, 116 PC

[56] References Cited

U.S. PATENT DOCUMENTS 4,627,671 12/1985 Matsui et al. ............... 303/116 SP

FOREIGN PATENT DOCUMENTS

| 3119803 | 12/1982 | Fed. Rep. of Germany ....... 303/116 PC |
| 3538839 | 5/1986 | Fed. Rep. of Germany ... 303/116 R |
| 3824877 | 2/1989 | Fed. Rep. of Germany ... 303/116 R |
| 3900852 | 3/1990 | Fed. Rep. of Germany ...... 303/113 TR |

Primary Examiner—Matthew C. Graham
Attorney, Agent, or Firm—Edwin E. Greigg; Ronald E. Greigg

[57] ABSTRACT

A brake system having a pressure control valve assembly with an inlet valve in a brake line between a master brake cylinder and a wheel brake cylinder. The brake system is also equipped with a precharging pump and a return pump. A charging valve is disposed in a feed line connecting the two pumps. In phases of brake pressure holding and brake pressure reduction upon traction control, the pumping of brake fluid through the continuously operated return pump by the precharging pump is intended to be suppressed. When the precharging pump and the return pump are driven by a common drive motor, the charging valve, which is embodied as a 2/2-way valve, assures that when the anti-skid system becomes operative an exchange of brake fluid between the precharging pump and the return pump is suppressed. When the traction control becomes operative, contrarily, the valve enables pumping of brake fluid from the precharging pump to the return pump, but only whenever the pressure control valve is switched for pressure buildup.

2 Claims, 2 Drawing Sheets

HYDRAULIC BRAKE SYSTEM WITH ANTI-SKID SYSTEM AND TRACTION CONTROL FOR A VEHICLE

BACKGROUND OF THE INVENTION

The invention is based on a hydraulic brake system with an anti-skid system and traction control for a vehicle, as defined hereinafter.

A vehicle brake system of this type has already been proposed in which a precharging pump and a return pump are driven independently of one another. When the traction control is operative, the precharging pump, embodied as a low-pressure pump with a high pumping flow pumps brake fluid to the inlet of the return pump. The return pump, which is capable of pumping brake fluid at high pressure and a low pumping flow compared with the precharging pump, forces brake fluid into the wheel brake cylinder of the spinning vehicle wheel upon pressure buildup. However, while the traction control is operative, a pressure buildup is required for only a relatively short length of time. For the period of time including the phases of pressure holding and pressure reduction during traction control, the brake fluid pumped by the return pump must therefore be diverted, for instance via a pressure limiting valve, which can mean that the brake fluid is heated considerably. To reduce this power loss, it has been proposed that the drive motor of the precharging pump be triggered in pulsed fashion subsequent to the initial filling of the wheel brake cylinder during traction control, in order in this way to reduce the pumping flow of the return pump. Because of the high turn-on current intensity of the drive motor, this triggering is attainable only at great expense.

OBJECT AND SUMMARY OF THE INVENTION

The hydraulic vehicle brake system has an advantage over the prior art that the expense both for the structure and the circuitry of the two pumps is reduced, as is the thermal load on the brake fluid. Moreover, in periods of pressure holding and pressure reduction during traction control, the return pump is not so noisy, because it is operating in the partial-filling range. Furthermore, the multi-position valve, when traction control is operative, prevents an outflow of brake fluid through the precharging pump to the supply tank.

The embodiment of the pump drive disclosed herein advantageously saves structural volume, electric and hydraulic lines and hoses, and retainers for the pumps.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
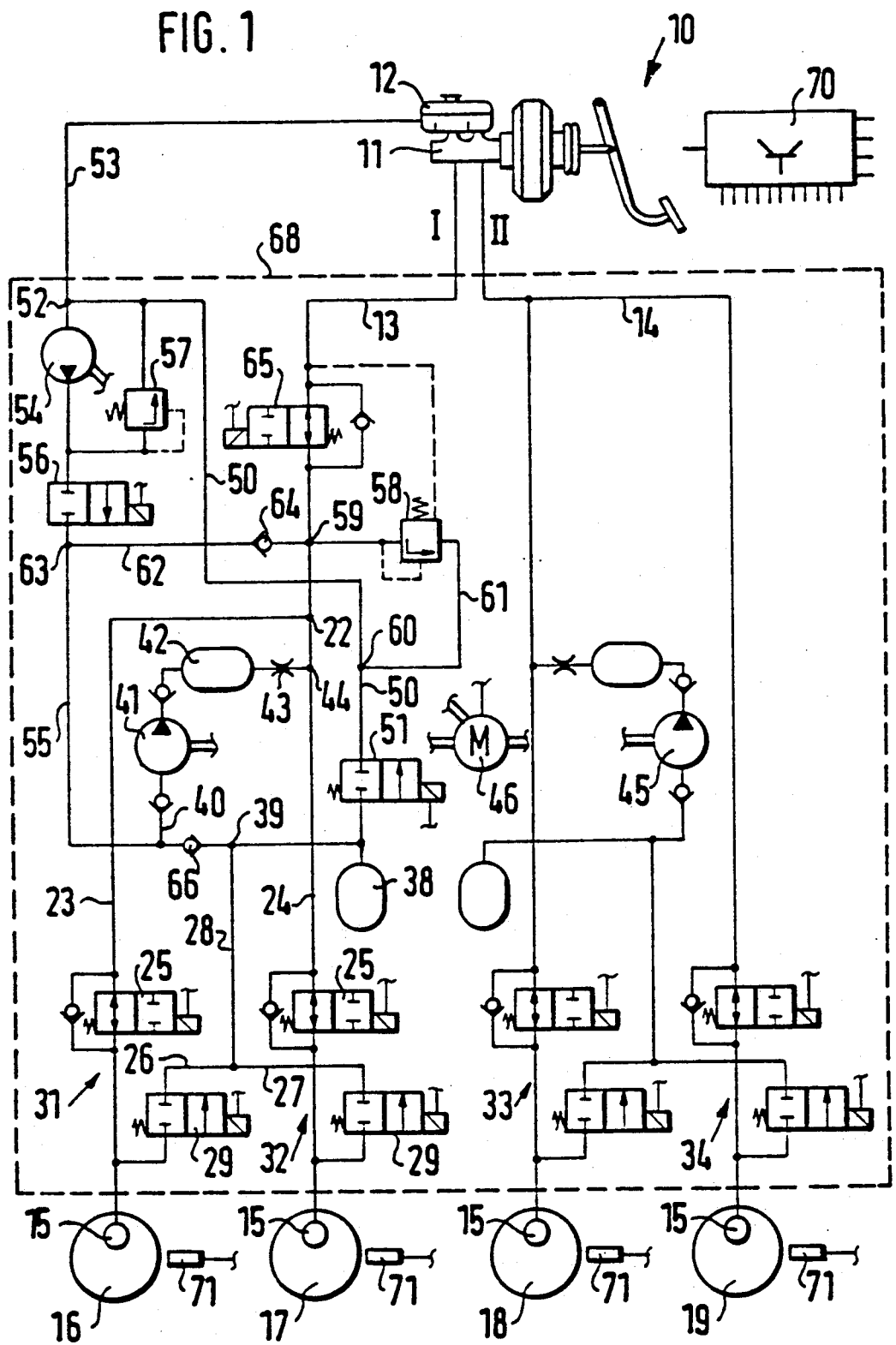
FIG. 1 is a circuit diagram for a hydraulic brake system for a vehicle having a precharging pump and a return pump.

The hydraulic brake system 10 schematically shown in FIG. 1 has a pedal-actuated master brake cylinder 11 with a supply tank 12 for brake fluid. One brake line 13 of a brake circuit I and one brake line 14 of a brake circuit II originate at the master brake cylinder 11. Wheel brake cylinders 15 of vehicle wheels 16 and 17 of a driven vehicle axle, not shown, are assigned to brake circuit I. Brake circuit II includes wheel brakes 15 of vehicle wheels 18 and 19 of a nondriven vehicle axle, again not shown.

At the point 22, the brake line 13 forks into two line branches 23 and 24. The line branch leading to the wheel brake cylinder 15 of the vehicle wheel 16, like the line branch 24 of the vehicle wheel 17, has an inlet valve 25 in the form of a 2/2-way valve, which is connected to be open in its spring-actuated basic position, while its blocking position, as the working position, can be controlled ectromagnetically. Originating between the inlet valve 25 and the wheel brake cylinder 15 of each brake line branch 23 and 24 is the branch 26, 27 of a return line 28 for brake fluid each of which include a one-way control valve. An outlet valve 29 in the form of a 2/2-way valve is seated in each return line branch 26, 27. Its basic position is a spring-actuated blocking position, and its working position is an electromagnetically switchable open position. The inlet valves 25 and the outlet valves 29 each form one pressure control valve assembly 31 and 32, assigned to the wheel brake cylinders 15 of the vehicle wheels 16 and 17 of the driven axle, for pressure buildup, pressure holding and pressure reduction in the wheel brake cylinder 15. Pressure control valve assemblies 33 and 34 are correspondingly assigned to the wheel brake cylinders 15 of the vehicle wheels 18 and 1 of the nondriven vehicle axle.

A reservoir chamber 38 for holding brake fluid is connected to the return line 28. A line 40 begins at point 39 of the return line 28, and a return pump 41, a damper chamber 42 and a throttle 43 are disposed in this line 40. The pump line 40 discharges at point 44 in the brake line 13. Both a return pump 45 disposed in the identically equipped brake circuit II and the return pump 41 can be driven with a shared electric drive motor 46.

The return line 28 is continued from point 39 in the form of a line portion 50 having a check valve 51 in the form of a 2/2-way valve. The basic position of this valve is a spring-actuated blocking position, and it can be electromagnetically switched into an open position as its working position. The line portion 50 discharges at point 52 into an intake line 53 to the pump 54, which also communicates with the supply tank 12 for brake fluid. A precharging pump 54 that is also drivable by the drive motor 46 is connected to the suction line 53. It is capable of aspirating brake fluid from the supply tank 12 and pumping it at low pressure but with a relatively large pumping flow. Contrarily, the return pumps 41 and 45 are designed to pump a relatively small pumping flow at high pressure. A feed line 55 extends from the outlet of the precharging pump 54 to the inlet of the return pump 41. Disposed in this feed line is a charging valve 56, in the form of a 2/2-way valve with a spring-actuated blocking position as its basic position and an electromagnetically switchable open position as its working position. A pressure limiting valve 57 is connected parallel to the precharging pump 54. A pressure limiting valve 58 assigned to the return pump 41 is also provided, seated in a line 61 that begins at point 59 in the brake line 13 and discharges at point 60 in the line portion 50. A line 62 begins at point 59 of the brake line 13 and is connected at point 63 to the feed line 55. Located in the line 62 is a one-way check valve 64 that has a blocking direction from the brake line 13 toward the feed line 55. A shutoff valve 65 in the form of a 2/2-way valve is also disposed in the brake line 13 between the point 59 and the master brake cylinder 11. It is open in its spring-actuated basic position, while in its electromagnetically switchable working position it interrupts the brake line 13. Finally, a one-way check valve 66 having a blocking action toward point 39 is located between the inlet of the return pump 41 and point 39 of the return line 28.

The above-described elements and component assemblies of the vehicle brake system 10 are combined in a so-called hydraulic unit 68, which is represented in the circuit diagram of FIG. 1 by an area outlined in dashed lines.

The vehicle brake system 10 has an electronic control unit 70, which monitors the wheel rotation behavior with the aid of rpm sensors 71 assigned to the vehicle wheels 16–19, and as a function of their behavior switches the valves 25, 29, 51, 56, 65 and the drive motor 46 of the pumps 41, 45, 54 in accordance with a predetermined control algorithm.

The vehicle brake system 10 functions as follows:

During normal operation of the vehicle, the valves 25, 29, 51, 56, 65 of the brake system 10 assume their basic position, shown, and the pumps 1, 45, 54 are not driven. Upon braking desired by the driver, brake pressure is generated in the master brake cylinder 11 and transmitted to the wheel brake cylinders 15 of the all the vehicle wheels 16–19 by shifting partial amounts of brake fluid in the brake lines 13, 14 and the line branches 23, 24. If during this kind of braking event the vehicle wheel 16, for instance, enters an unstable operating state, or in other words threatens to lock, then the control unit 70, based on the signals of the rpm sensor 71 assigned to this wheel 16, turns on the anti-skid system of the vehicle brake system 10. The control unit 70 switches the inlet valve 25 of the pressure control valve assembly 31 into its blocking position, to prevent a further rise in pressure in the wheel brake cylinder 15 of the vehicle wheel 16. The control unit 70 also switches the outlet valve 29 of the pressure control valve assembly 31 into its open position, so that brake pressure can decrease in the wheel brake cylinder 15 and the vehicle wheel 16 can stabilize. The brake fluid flowing out of the wheel brake cylinder 15 through the line branch 26 of the return line 28 is received by the reservoir chamber 38. When the anti-skid system becomes operative, the electric drive motor 46 of the pumps 41, 45, 54 is put into operation by the control unit 70. The brake fluid withdrawn in the phase of pressure reduction in the wheel brake cylinder 15 of the vehicle wheel 16 is therefore pumped into the brake line 13 back to the master brake cylinder 11 by the return pump 41. In the pressure holding phase that follows the phase of pressure reduction in the wheel brake cylinder 15, the outlet valve 29 of the pressure control valve assembly 31 is switched to its blocking position. As soon as the vehicle wheel 16 has stabilized, a phase of pressure buildup in the wheel brake cylinder 15 begins. To this end, the inlet valve 25 of the pressure control valve assembly 31 is switched to its open position, so that from the master brake cylinder 11, the brake pressure in the wheel brake cylinder 15 of the vehicle wheel 16 can be increased. If all the vehicle wheels 16–19 are exhibiting stable wheel rotation behavior, the control unit 70 switches the anti-skid system off.

On the other hand, if upon startup or acceleration of the vehicle the wheel 16, for instance, of the driven axle enters an unstable operating state or in other words is subject to excessively high rotational slip, then the control unit 70 switches the traction control on. To do this, the control unit 70 switches the shutoff valve 65 into its blocking position and the check valve 51 to its open position. The control unit also switches on the drive motor 46. The precharging pump 54 now draws brake fluid from the supply tank 12 of the master brake cylinder 11 and pumps it through the line 62 into the brake line 13, overcoming the check valve 64, so that when the inlet valve 25 of the control valve assembly 31 assumes its open position brake pressure is built up in the wheel brake cylinder 15 of the vehicle wheel 16 in a very short time, and the calipers are rapidly brought into engagement. At the same time, the precharging pump 54 pumps brake fluid through the feed line 55 to the inlet of the return pump 41. The return pump 41 positively displaces brake fluid into the brake line branch 23 at higher pressure but with a smaller pumping flow than the precharging pump 54 and causes a further rise in pressure in the wheel brake cylinder 15 of the vehicle wheel 16. As soon as the pressure of the return pump 41, at the onset of traction control, exceeds the pressure of the precharging pump 54, the check valve 64 in the line 62 closes, and the further buildup of brake pressure in the wheel brake cylinder 15 is determined by the return pump 41.

In a pressure holding phase that follows the brake pressure buildup phase, the inlet valve 25 and the charging valve 56 are switched to their blocking position, while the pumps 41 and 54 remain in operation. Brake fluid pumped by the precharging pump 54 is therefore diverted via the parallel-connected pressure limiting valve 57. Because the charging valve 56 assumes its blocking position, the return pump 41 is not offered any brake fluid in the pressure holding phase, and so it operates in the partial filling range; that is, it does not pump any brake fluid and, as desired, generates little noise.

The pressure holding phase can be followed by further phases of pressure buildup and pressure holding. If the traction control requires a reduction of pressure in the wheel brake cylinder 15 of the vehicle wheel 16, then the control unit 70 switches the outlet valve 29 of the pressure control valve assembly 31 into its open position, while the inlet valve 25 assumes its blocking position. Brake fluid can flow out of the wheel brake cylinder 15 through the line branch 26 of the return line 28, with the check valve 51 assuming its open position, and then through the line 50 to the line 53 and on into the supply tank 12 of the master brake cylinder 11. The pressure reduction in the wheel brake cylinder 15 can be limited by shifting the outlet valve 29 into its blocking position, or upon termination of traction control the pressure in the wheel brake cylinder 15 of the vehicle wheel 16 can be reduced fully. Upon the end of traction control in the wheel brake cylinder 15 of the vehicle wheel 16, the control unit 70 switches off the driver motor 46 of the pumps 41 and 54 and shifts the return valve 51 and the outlet valve 29 of the control valve assembly 31 into their blocking position, while it switches the shutoff valve 65 and the inlet valve 25 of the pressure control valve assembly 31 to their open position.

During traction control, the proportion of pressure buildup phases, within the total duration of all the phases of pressure buildup, pressure holding and pressure reduction in the wheel brake cylinder, is only 10 to 20%. As noted, by switching the charging valve 56 into its open position during this brief portion of the time, the return pump 41 is supplied with brake fluid by the precharging pump 54, so that the return pump can feed brake fluid into the wheel brake cylinder 15 at high pressure. It is highly significant that the charging valve 56 can be switched into its open position only whenever the pressure control valve assembly of the slipping wheel requires a pressure buildup, or in other words when the corresponding inlet valve 25 assumes its open position. During this period of time of pressure buildup, the return pump 41 operates in the full filling range, while contrarily in the phases of pressure holding and pressure reduction it operates only in the partial filling range, with a corresponding noise abatement. As a result of this kind of operation of the return pump 41 during traction control, not only is a low thermal burden on the brake fluid attained, but also on average a very much smaller pumping flow of brake fluid into the wheel brake cylinder 15, compared with the very much larger pumping flow of the return pump 41 when the anti-skid system is operative, where a fast reduction of brake pressure in the wheel brake cylinder 15 is necessary. A small pumping flow is desirable during traction control so that after the engagement of the brake calipers, the brake pressure in the wheel brake cylinder can be regulated sensitively. During the phases of pressure holding and pressure reduction during traction control, in which the charging valve 56 assumes its blocking position and therefore the return pump 41 receives no brake fluid, the brake fluid pumped by the precharging pump 54 is diverted via the pressure limiting valve 57, which because of the low pumping pressure of the precharging pump 54 is attended by an allowable heating of the brake fluid. Finally, the fact that the charging valve 56 is in its blocking position when the anti-skid system is operative assures that in pressure reduction no brake fluid can flow out through the feed line 55, precharging pump 54, and intake line 53 to the supply tank 12 of the master brake cylinder 11.

Figure 2:
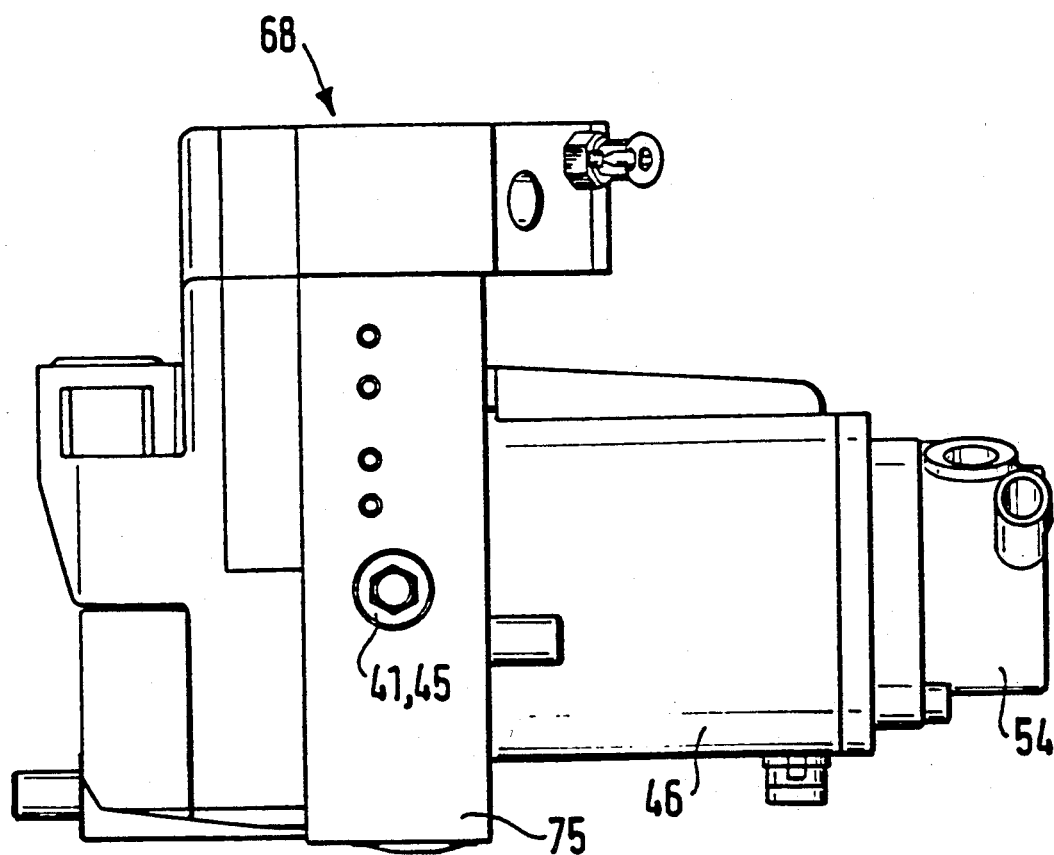
FIG. 2 is a view of a hydraulic unit with a shared drive motor for the precharging pump and the return pump.

It can be seen from the embodiment of the hydraulic unit 68 shown in FIG. 2 that this unit has a housing 75, in which both return pumps 41 and 45 are disposed and which also accommodates valves, other components, and lines of the brake system. The electric drive motor 46 is mounted on the housing 75 of the hydraulic unit 68, and the precharging pump 54 is flanged to the free face end of the drive motor. Accordingly, the drive motor 46 drives the return pumps 41 and 45 and the precharging pump 54 in common.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic vehicle brake system (10) with an anti-skid system and traction control,
   having a master brake cylinder (11) that generates a brake pressure, from which cylinder a brake line (13, 23) leads to at least one wheel brake cylinder (15),
   a pressure control valve assembly (31), connected to the brake line (13, 23), for pressure buildup, pressure holding and pressure reduction in the wheel brake cylinder (15),
   a return pump (41), driven by an electric drive motor (46), for pumping brake fluid out of the wheel brake cylinder (15) when the anti-skid system becomes operative and to pump brake fluid into the wheel brake cylinder (15) when the traction control becomes operative,
   a precharging pump (54) for drawing brake fluid from a supply tank (12) and pumping it to an inlet of the return pump 41 when traction control becomes operative,
   and a valve (56) is disposed in a line (55) that extends between the precharging pump (54) and a line (28) that leads from the pressure control valve assembly (31) to the inlet of the return pump (41),
   the return pump (41) and the precharging pump (54) have a common drive motor (46) and are driven simultaneously; and
   said valve (56) is embodied as a 2/2-way valve, which when the anti-skid system becomes operative prevents an exchange of brake fluid between the precharging pump (54) and the return pump (41), but when the traction control becomes operative enables the pumping of brake fluid from the precharging pump (54) to the return pump (41) when the pressure control valve assembly (31) is switched to pressure buildup.

2. A vehicle brake system is defined by claim 1, in which the precharging pump (54) is flanged to a side of the drive motor (46) remote from the return pump (41).

* * * * *